Patented July 14, 1936

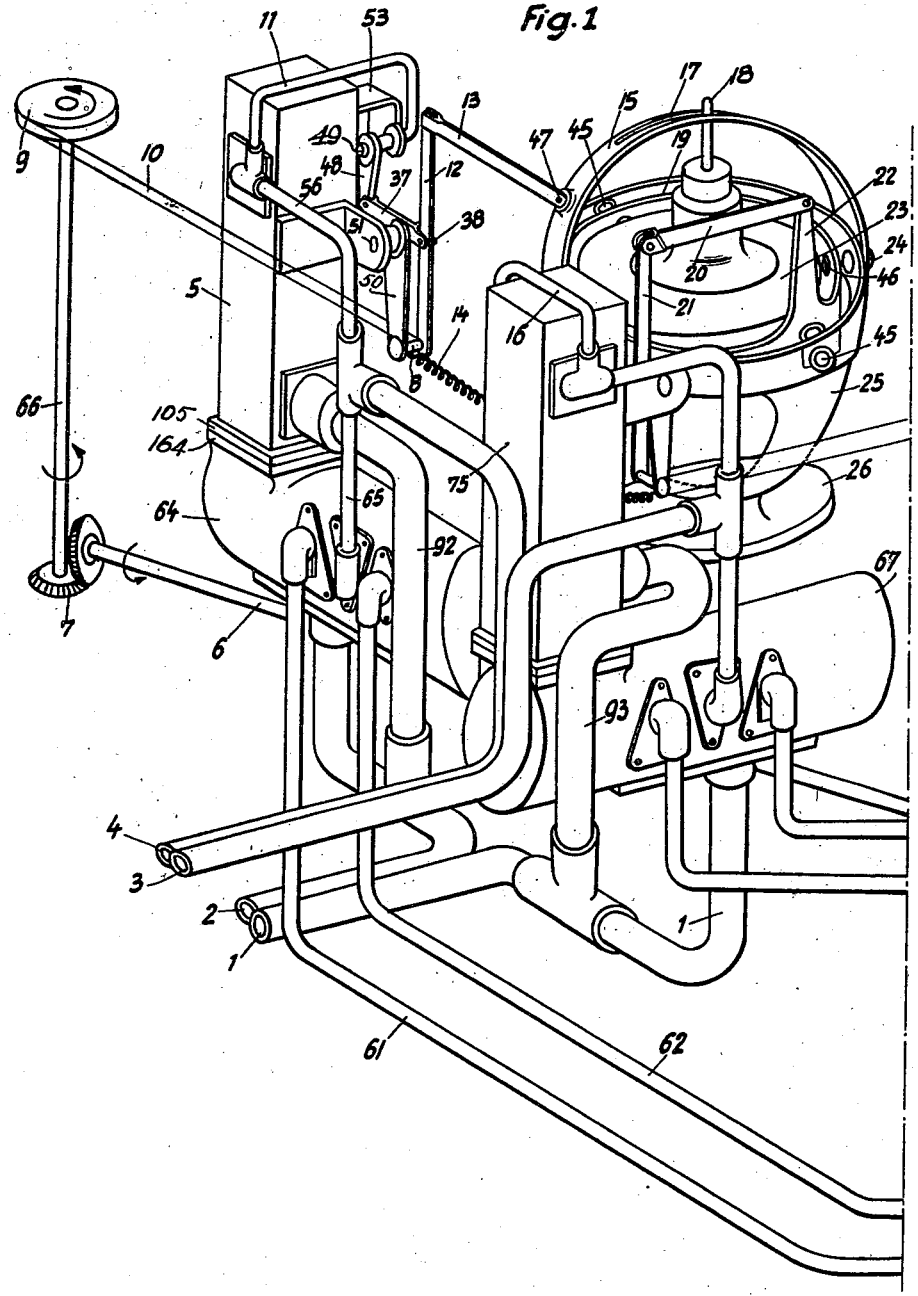

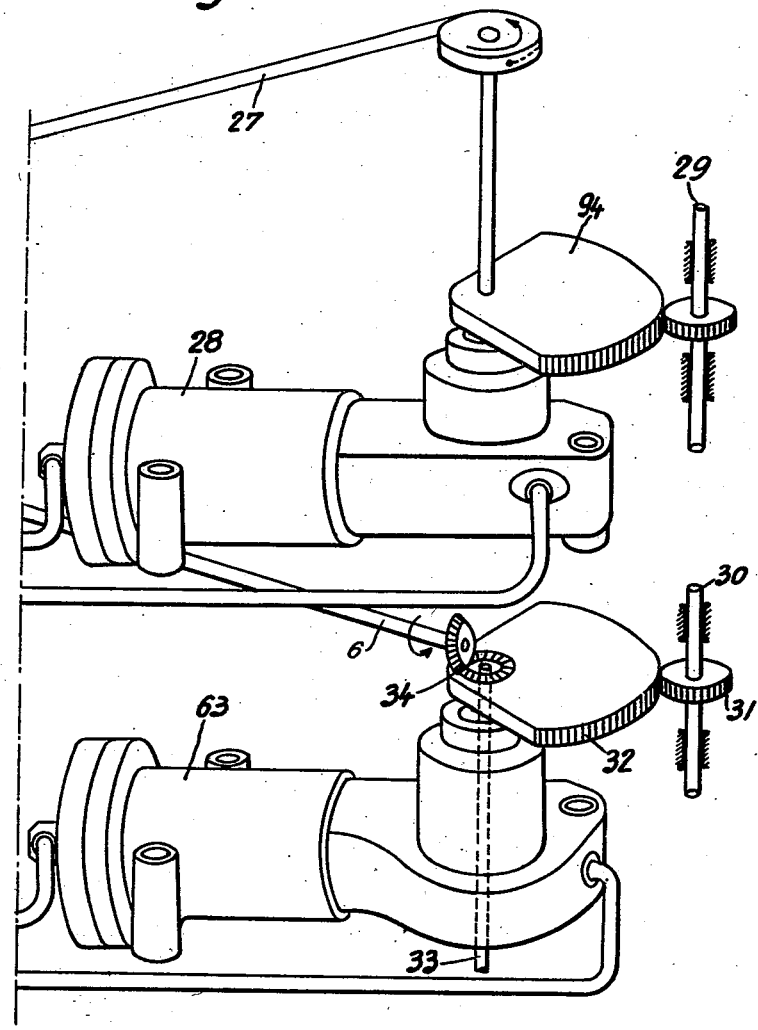

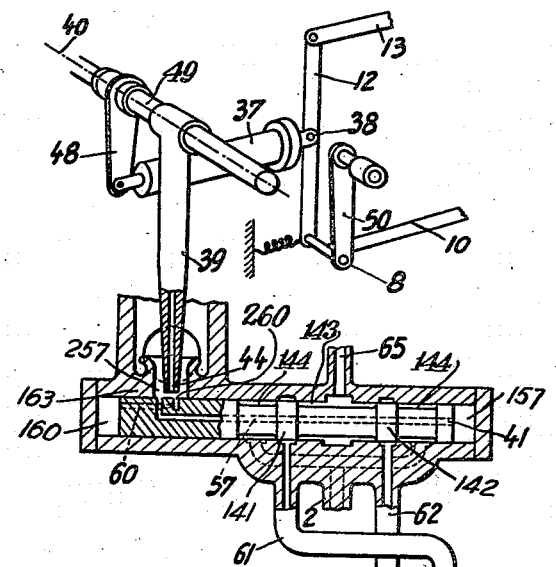
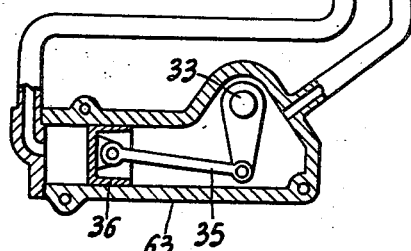
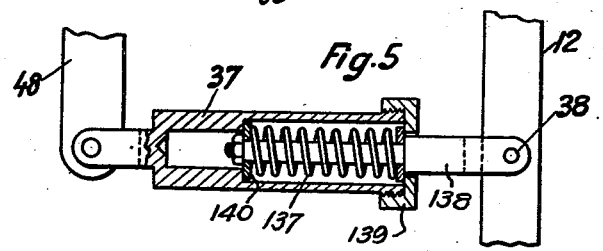

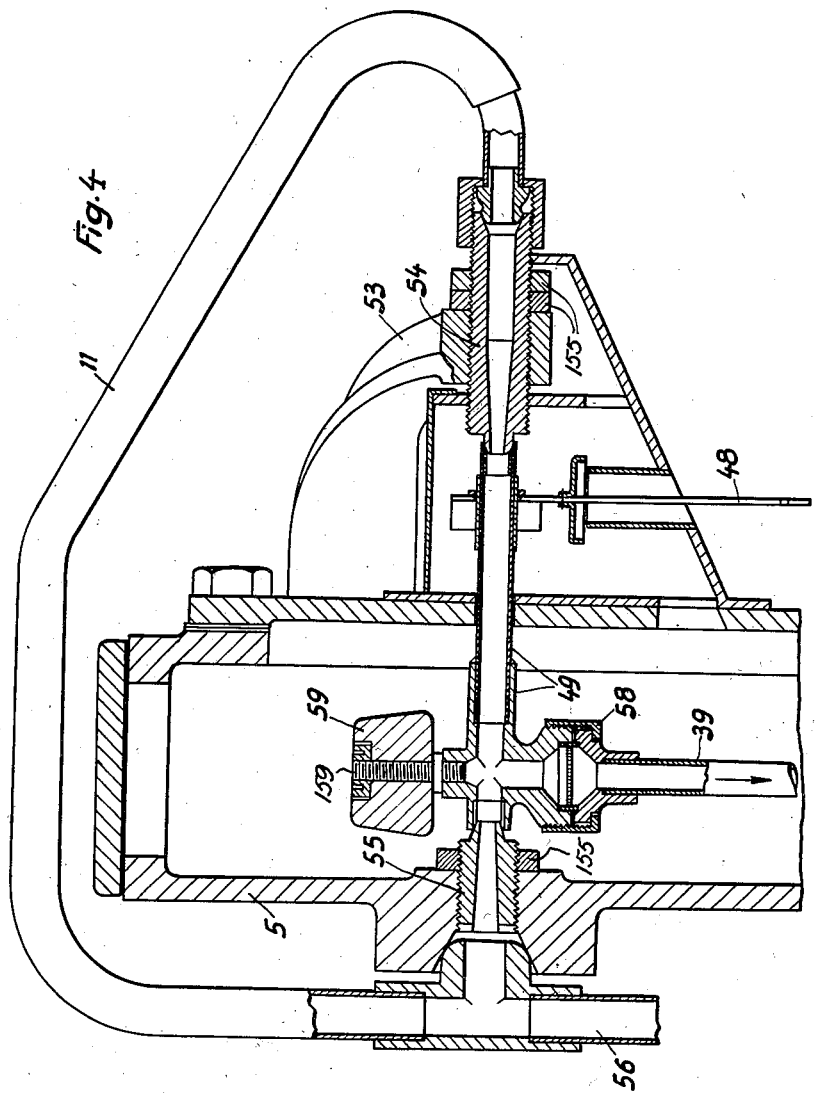

2,047,922

UNITED STATES PATENT OFFICE 2,047,922

GYROSCOPE-CONTROLLED APPARATUS

Johannes Seligmann, Kiel, Germany, assignor to Nederlandsche Technische Handel Maatschappij "Giro", The Hague, Netherlands Application May 5, 1933, Serial No. 669,617
In Germany May 6, 1932

6 Claims. (Cl. 74—5)

My invention relates to gyroscope-controlled apparatus and, more particularly, to an apparatus for stabilizing bodies.

One object of my invention is the provision of mechanism for stabilizing bodies mounted on a movable support, for instance optical instruments mounted on board ship, by operation of servo-motors which are controlled from a gyroscopic instrument.

Other objects of my invention are to provide a mechanism of the character indicated in which the servo-motors or their controlling equipment will not exert on the gyroscope carrier any substantial reaction which would give rise to undesired precessional deviations of the gyroscope; to simplify the controlling equipment of the servo-motors and to provide a rugged structure therefor which is inexpensive in manufacture and reliable in operation; to provide fluid-controlled mechanism for stabilizing the bodies, whereby the necessity of using sensitive and complicated electrical equipment is eliminated; to employ a single gyroscope which is so mounted in a carrier that its axle will normally maintain a vertical position, the carrier being mounted to partake in turns of the ship or the like about the vertical axis; to provide two fluid-controlled motors having controlling valves connected with the gyroscope carrier by mechanical means and being adapted to turn the body to be stabilized about two horizontal axes positioned at right angles to each other; to provide each fluid-controlled motor with a sensitive and efficient controlling valve mechanism including an adjustable nozzle which is jointly controlled by the gyroscope carrier and by the fluid-controlled motor, whereby the motor will be stopped automatically after having performed the requisite stabilizing motion under the command of the gyroscope carrier.

Other objects of my invention will appear from the following description of a preferred embodiment of my invention which is illustrated in the accompanying drawings. The features of novelty will be pointed out in the claims.

In the drawings

Figs. 1 and 2 are a perspective view of the gyroscope carrier and the fluid-operated means controlled thereby, Fig. 2 being a continuation of Fig. 1 towards the right, Fig. 3 illustrates one of the hydraulic cylinders with its slide valve and with the nozzle controlling the latter, the slide valve and the cylinder being shown in axial section while the nozzle and its linkage is shown in a perspective view;

Fig. 4 is a section through the upper portion of the motor casing, the section being taken along the shaft carrying the controlling nozzle;

Fig. 5 is an axial section through the nozzle-controlling link, and

Figure 6:
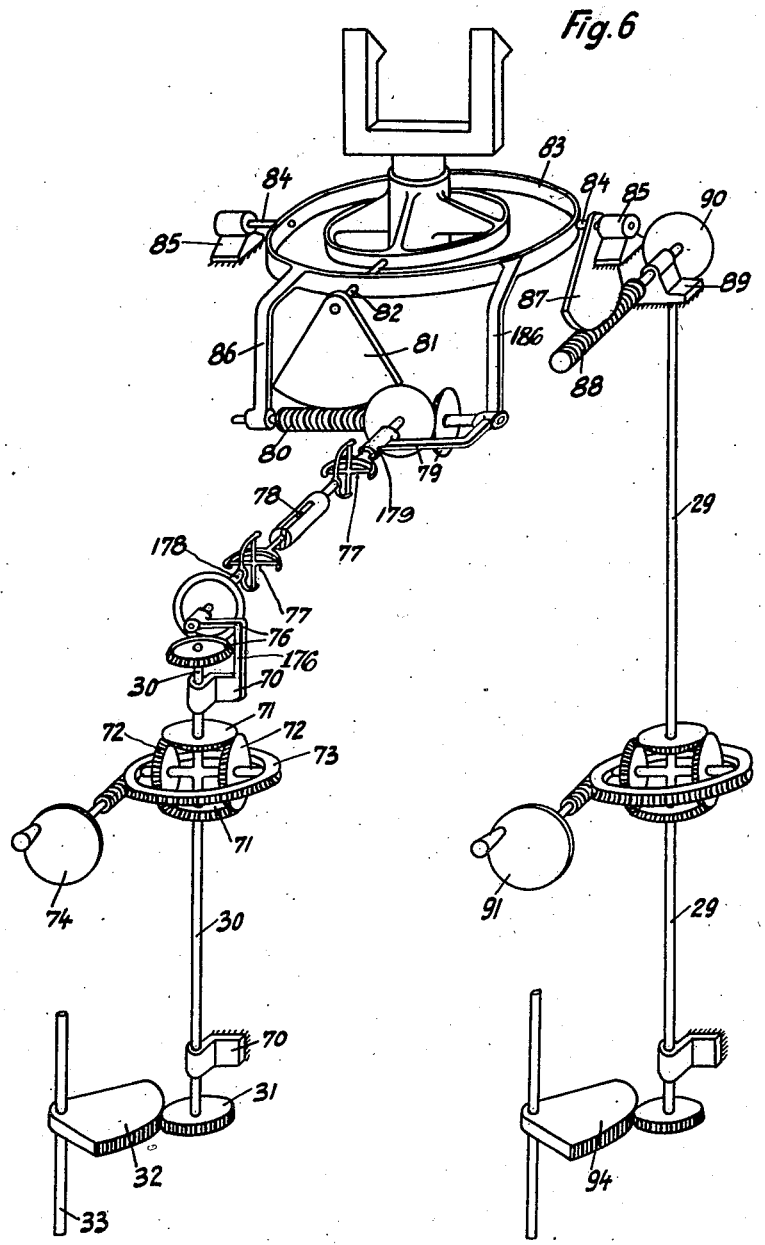
Fig. 6 is a perspective view illustrating a body to be stabilized and its connections with the fluid-operated motors.

In Fig. 1, I have illustrated a basket 25 having a foot 26 which is fixedly attached to a suitable support on board ship so as to partake in all movements of the ship. Two horizontal pivots 45 are mounted in the basket 25 in opposed relation and carry a gimbal ring 19 within which the gyroscope carrier in form of a casing 23 is suspended by means of two pivots 46 positioned in diametrically opposed relation displaced by 90° relative to the pivots 45. The gyroscope casing 23 contains a gyroscope which is driven in the customary manner by an electric motor and is so mounted that its axis tends to assume a vertical position. The casing is provided at its top with a pin 18 extending in the direction of the gyroscope axis and engaging a slot 17 provided in a bail 15. The ends of the bail 15 are mounted on horizontal pivots 24 provided to extend from the upper marginal portion of the basket 25 in opposed diametrical relation displaced by 90° with respect to the pivots 45.

Preferably, the apparatus is so mounted on board ship that the axis of the pivots 45 extends in the longitudinal direction of the ship. Consequently, if the ship is pitching, the pin 18 retains bail 15 in vertical position and thus displaces the same, relative to the ship, an amount corresponding at any time to the pitching angle. The gimbal ring 19 is turned relative to the ship an amount corresponding at any time to the rolling angle, if the ship is rolling.

The two elements 15 and 19 pivotally mounted to swing about the horizontal axes of pivots 24 and 45 extending perpendicularly to each other in fixed relation to the ship, serve each to control one fluid-operated motor. To this end, bail 15 is provided with a stud 47 extending parallel to its axis of oscillation. This stud is connected with the upper arm of a vertical double-armed lever 12 through a horizontally extending rod 13. The lever 12 is mounted on a pivot 38 carried by a horizontally extending link 37. The lower arm of lever 12 is pivoted at 8 to a downwardly extending link 50 which is mounted on a pivot 51 carried by a suitable bracket 151 attached to the casing 5 of the motor. The casing 5 is suitably secured to the structure of the ship so as to partake in the movements thereof. The link 37 which is longitudinally displaced in one direction or the other because of oscillations of bail 15 is linked to an arm 48 of a horizontally extending hollow shaft 49, compare Fig. 4, which is freely rotatably mounted in the casing of the servo-motor valve to turn about its axis 40, indicated in Fig. 3, and carries a downwardly extending nozzle 39. Hence, any turn of bail 15 causes a corresponding rocking movement of the nozzle about the axis 40. The mounting of the nozzle is illustrated in Fig. 4 in detail. Hollow studs 54, 55 having conical ends are inserted in tapped openings provided in one of the walls of casing 5 and in an opposed bracket 53 suitably attached to casing 5 by bolts. The studs 55 are adjustably secured in position by nuts 155 and communicate by pipes 4, 56 and 11 with a suitable source of pressure fluid, for instance oil, supplied by a pump (not shown). On the conical ends of the hollow studs, the hollow shaft 49 is supported which is suitably of a composite structure, one of its parts being formed by a casting to which the nozzle 39 is secured by a nut 58. The nozzle 39 is counterbalanced by a suitable weight 59 attached to the casting by a bolt 159, as shown in Fig. 4. From the foregoing it will be apparent that the pressure oil is supplied to the hollow shaft 49 from both ends. Owing to this arrangement, any axial thrust on shaft 49 is eliminated, and the shaft is mounted to freely float without any friction on a thin layer of oil formed by a small leakage between the conical ends of studs 54, 55 and the walls of the shaft 49. The absence of friction in the mounting of shaft 49 and nozzle 39 will reduce the unavoidable reactionary forces exerted on the gyroscope to a negligible minimum.

The casing 5 is formed with a flange 105 at its bottom. To this flange there is bolted a flange 164 provided on a horizontal cylindrical casing 64 within which a piston slide 41 is guided, as diagrammatically illustrated in Fig. 3. The casing 64 is sealed at its ends so as to provide for cylindrical spaces between its end-walls and the end faces of the piston slide 41. These spaces indicated at 157 and 160 in Fig. 3 communicate with two conduits 57, 60 extending longitudinally through the piston slide and leading to apertures 257 and 260 provided in the upper face of the piston slide one beside the other. The partition wall 163 arranged between the casing 5 and the cylindrical casing 64 is provided with an opening through which the nozzle 39 extends. Normally, the nozzle mouth 44 is in registry with a point located intermediate the two apertures 257 and 260 of the conduits 57 and 60, as shown in Fig. 3. These apertures are arranged in the plane of movement of the nozzle 39.

As shown in Fig. 3, the movement of nozzle 39 is limited by the walls of the opening provided in the partition 163. As it may happen, however, that the gyroscope performs larger movements relative to the ship than the limited movement permitted by oscillation of nozzle 39, resilient elements are included in the connecting linkage. In the embodiment shown, the link 37 is formed by a tube (compare Fig. 5) in which a helical spring 137 is inserted. This spring surrounds a stem 138 pivoted to lever 12 and abuts with its one end against a cover plate 139 secured on the tube 37 by screws and with its other end against a washer 140 attached to the stem. Therefore, the lever 12 is capable of a movement independent of the nozzle 39 and, during such movement, the spring provided within the link 37 is compressed.

Normally, such an operation will not occur as will appear from the description following hereinafter. Under certain circumstances, however, for instance, if the source of pressure oil should fail, it may happen that the nozzle 39 abuts against the casing. In this event, the gyroscope carrier may move independently of the nozzle owing to the provision of the resilient element. In the absence of such a resiliency it could happen that the nozzle 39 would be injured and bent under the powerful force exerted by the gyroscope.

When the bail 15 oscillates in normal operation, its movement is transmitted by the connecting elements 13, 12, 37, 48 and 49 to the nozzle 39 which is thus moved from its normal position, shown in Fig. 3, to registry with one or the other aperture of the conduits 57, 60 and thus directs its jet of oil into one or the other of these conduits, whereby a superpressure will be produced in one or the other of the chambers adjoining the end faces of the piston slide causing the piston slide 41 to move towards the right or towards the left so as to follow the nozzle and to return its apertures to a symmetrical position relative to the nozzle mouth 44.

A pipe 92 (Fig. 1) connects the bottom portion of casing 5 with a discharge pipe 2 to take up the exhaust oil overflowing the apertures of conduits 57 and 60.

When the slide 41 assumes its central position illustrated in Fig. 3, two collars 141 and 142 provided on the piston slide are positioned to seal the apertures of two conduits which are provided in casing 64 and are connected with pressure pipes 61, 62 communicating with opposite ends of the motor block 63. A peripheral recess 143 of the piston slide 41 cut out between the two collars communicates permanently with a boring which is provided in the casing 64 and communicates with the pressure oil pipe 4 through a pipe 65, while two lateral peripheral recesses 144 of the piston slide communicate through suitable borings shown in Fig. 3 in dotted lines, with a discharge pipe 2 which feeds the exhaust oil back to the pump.

The motor block 63 which is suitably attached to the structure of the ship has a cylindrical boring receiving a piston 36 adapted to act through a connecting rod 35 on a crank of a crankshaft 33 suitably journalled in the block 63. The cylinder head mounted on the block 63 is provided with an aperture to which the pipe 62 is connected. Similarly, the crank casing portion of the housing 63 is provided with an aperture communicating with the pipe 61.

From the foregoing it will be apparent that as soon as the slide valve 41 moves from its normal position shown in Fig. 3 in one or the other direction following a displacement of nozzle 39, one of the pipes 61, 62 is brought to communication with the pressure feed line 65, while the other one of the pipes 61, 62 will communicate with the discharge line 2. Thus, pressure will be applied to one side of piston 36 while the other side is relieved from pressure and the piston 36 will move thereby turning shaft 33. The arrangement is such that the full stroke of piston 36 will result in a limited turn of the crank only so that the crank will never be brought to a dead-centered position.

As will appear from Fig. 2, a toothed sector 32 is attached to the shaft 33 and arranged in mesh with a gear 31 keyed to a vertical shaft 30. The shaft 30 is geared to the body to be stabilized, as shown in Fig. 6.

In the embodiment shown, the shaft 30 which is mounted in brackets 70 is a split-shaft and its upper and lower sections are connected through a differential gearing comprising bevel gears 71 attached to the opposed ends of the split-shaft 30 and arranged in mesh with epicyclic bevel gears 72 carried by a rotary worm gear 73. The worm gear is adapted to be turned by a worm to which a hand crank 74 is attached. Hence, the operator may angularly displace the sections of the split-shaft 30 relative to each other independently of the turns which may be imparted to the split shaft 30 by the toothed sector 32 and are transmitted from the lower section of shaft 30 to the upper through the bevel gears 72. The shaft 30 is connected through another pair of bevel gears 76 to a composite shaft, which consists of three sections 78, 178 and 179 connected by two universal joints 77, the middle section 78 of the shaft being of telescope structure. The section 178 of the shaft is journalled in an extension 176 of the bracket 70, while the section 179 is journalled in an arm 186 depending from and integral with the gimbal ring 83. The shaft 179 acts on a pair of bevel gears 79 which transmit motion to a worm 80 mounted to engage a toothed sector 81 carried by a shaft 82 which extends diametrically through a horizontal gimbal ring 83 and is attached between its ends to the foot of the body to be stabilized which, in the instant case, is an optical instrument. The gimbal ring 83 has two diametrically opposed studs 84 which are arranged at right angles relative to the shaft 82 and are mounted in suitable brackets 85 attached to the structure of the ship. The worm 80 and the bevel gears 79 are carried by brackets extending from the gimbal ring 83, one of these brackets being indicated at 86 and the other one at 186 in Fig. 6.

One of the studs 84 has keyed to it a toothed sector 87 meshing with a worm 88 journalled in brackets 89 which are mounted on the structure of the ship. The worm 88 is in driving connection through a pair of bevel gears 90 with a vertical split shaft 29 which is similar to the split-shaft 30 in that its sections are connected through the intermediary of an epicyclic gearing adapted to be operated by a hand crank 91.

The split shaft 29 is actuated by a second fluid-operated motor which will be described later.

The piston 36 is automatically arrested when it has performed the requisite turn of shaft 33 by the following arrangement: The shaft 33 is in permanent driving connection with a shaft 6 through the intermediary of a pair of bevel gears 34. The shaft 6 operates in its turn a vertical shaft 66 through another pair of bevel gears 7. The shaft 66 carries a barrel 9 to the periphery of which the end of a ribbon 10 of metal or steel is attached. The ribbon 10 is wound upon the barrel 9 and its other end is attached to the pivot stud 8 carried by the lower end of arm 50. The arm 50 is resiliently drawn away from barrel 9 so as to keep the ribbon 10 taut, by a spring 14 anchored to a suitable point of casing 75. The ribbon 10 and the spring 14 cooperate to hold the pivot pin 8 stationary so long as the piston 36 remains at rest, i. e. when and only when the nozzle 39 assumes its normal central position shown in Fig. 3.

As soon as piston 36 starts on its way, due to a displacement of link 13 and consequent departure of nozzle 39 from its normal position, it causes the barrel 9 to be turned, whereby the pivot 8 is moved in a direction opposite to that displacement of link 13 which caused the piston 36 to be started. The double-armed lever 12 constitutes a differential resetting mechanism adapted to move the controlling nozzle 39 by action of link 13 and also by action of the fluid-operated motor for the purpose of returning the nozzle to neutral position. As the controlling slide 41 follows the nozzle 39 in its movements, as above described, the piston 36 is arrested as soon as the nozzle 39 has been restored to its neutral central position, shown in Fig. 3.

From the foregoing it is apparent that the valve mechanism 41, 141, 142 will have been reset to the normal position shown in Fig. 3 as soon as the hydraulically operated shaft 33 has performed a turn from normal position which is proportional to the angular relative displacement of the gyroscope pendulum 23 and the support carrying the basket 25.

The ratio of transmission of the gearing connecting the motor shaft 33 with the shaft 82 supporting the instrument to be stabilized, is so chosen that a displacement of link 13 caused by oscillation of the bail 15 through a certain angle will result in a displacement of piston 36 which causes the shaft 82 to be turned through the same angle and in the same sense, the shaft 82 being arranged to extend parallel to the axis of pivots 46, i. e. substantially parallel to the axis of the pivots 24.

Similarly, the rolling motion of the ship causes a second fluid-operated motor 28 to be put in action. This second motor and its controlling mechanism is substantially identical with that above-described, the nozzle casing being shown at 75 and the cylinder of the piston valve at 67. Hence, a detailed description of these elements may be dispensed with.

The pressure fluid is fed to the cylinder 67 through a pipe 3, while the discharge oil is conducted back to the pump from casing 75 and cylinder 67 through pipes 93 and 1.

The controlling nozzle of the second motor is operated by a differential mechanism in form of a double-armed lever 21 which is similarly arranged as the lever 12 and functions in the same manner. The upper end of lever 21 is connected by a link 20 with an upwardly projecting arm 22 of the gimbal ring 19 whereby turns of the gimbal ring about the pivots 45 will control the operation of the second fluid-operated motor. The second motor controls the resetting of its nozzle to neutral position by means of a steel ribbon 27 attached to a barrel directly mounted on the shaft of motor 28. This shaft carries a toothed sector 94 (Figs. 2 and 6) meshing with a pinion attached to shaft 29. From the above description of the gearing connecting shaft 29 with the gimbal ring 83 it will be apparent that any rolling motion of the ship will result in a turn of the gimbal ring 83 about its pivots 84. The gearing connecting motor 28 with the gimbal ring 83 has such a ratio of transmission that a turn of the gimbal ring 19 about its pivots 45 will result in an equal turn of ring 83 about its pivots 84, the axis of pivots 84 extending parallel to that of the pivots 45.

The position assumed by lever 12 at any time is representative of the pitching angle of the ship, while the position of lever 21 represents the rolling angle of the ship at any time, and the component movements of the levers 12 and 21 relative to the ship are separately transferred by the power-actuated shafts 30 and 29 to the stabilized instrument and are compounded to a resulting movement of the instrument carried by shaft 82, which resulting movement relative to the ship is fully identical with the movement of the gyroscope carrier 23. In other words, the vertical axis of the instrument to be stabilized is always kept parallel to pin 18, that is to say, in a position perpendicular to the horizon.

In event of a departure of pin 18 from the truly vertical position such as may be caused by precessional movements of the gyroscope, the handles 74 and 91 may be so turned as to bring the instrument to truly horizontal position in accordance with observations of the horizon or of other gyroscope-controlled apparatus or pendula. For a reliable operation, it is sufficient, that the gyroscope carrier 23 maintain its axis approximately in vertical position. Its primary function is to stabilize the instrument or other device against the fast rolling and pitching movements of the ship, while the truly horizontal adjustment of the instrument to be stabilized may be performed by manual operation of cranks 74 and 91.

The motors are put into and out of operation by a displacement of the nozzle 39 relative to the piston slide casing 64. Hence, the elements 39 and 64 represent means, the relative displacement of which is controlled by the gyroscope carrier and governs the operation of the respective motor. An important feature of my invention resides in the fact that one of two elements, preferably the casing 64, is stationary relative to the ship, while the other element is jointly controlled from the gyroscope carrier and from a servo-motor by the above-described differential element in form of the lever 12, or 21 respectively.

Prior to my invention, the use of sensitive electrical controlling means was generally considered an indispensable requirement for obtaining the requisite accuracy in operation. I have found, however, that with the arrangement as above described, the same accuracy may be attained without the use of such electrical equipment which is always objectionable from the view point of reliability and maintenance. It will also be appreciated from the foregoing that my apparatus is simple in construction and inexpensive to manufacture.

The gyroscope and its carrier 23 constitute what will be called a "gyroscope pendulum" in the claims following hereinafter, as the center of gravity is positioned below the center of suspension in which the axes of pivots 45 and 46 intersect, whereby the casing 23 will be yieldingly maintained in vertical position by the action of gravity similarly to a pendulum.

What I claim is:—

1. An apparatus for stabilizing bodies movably mounted on a movable support, comprising a vertical gyroscope pendulum, two movable elements, means connecting said elements to said gyroscope pendulum whereby said elements respond separately and individually to component turns of said pendulum about two normally horizontal axes of the body extending at right angles to each other, two shafts extending at right angles to each other and substantially parallel to said axes, means connecting said shafts to said body whereby movement of said shafts jointly controls the position of said body, two hydraulically operated motors mounted on said movable support, means connecting each of said motors to one of said shafts whereby operation of said motors moves said shafts, means to supply fluid under pressure to said motors, valves one in each fluid supply means, a means connected to each of said elements to control one of said valves whereby movement of said element moves said valves to control the operation of the motors, resetting means associated with said valves, and means connecting said resetting means to said motors, whereby said shafts will be turned through angles which are equal at all times to said component turns of the gyroscope pendulum.

2. In an apparatus for controlling the movements of a body from a gyroscope, the combination comprising a gyroscope carrier, a fluid operated motor, means to supply fluid to said motor, a movable valve in said supply means governing the extent and direction of movement of said motor, a nozzle, means to support said nozzle for adjustment in the direction of movement of said valve, means cooperating with said nozzle to cause the valve to follow the movement of the nozzle, a differential element, means connecting said differential element with said nozzle, and means connecting said differential element to the gyroscope carrier and to the motor to control the differential element whereby any movement of said carrier will cause said motor to perform a movement proportional to that of the carrier and then to stop.

3. An apparatus for stabilizing bodies mounted on a movable support comprising a vertical gyroscope pendulum, fluid operated motors mounted on said support, means connecting said motors to the body to be stabilized, means to supply fluid to said motors, slide valves in said supply means movable to govern the operation of said motors, nozzles, means to support said nozzles for adjustment in the direction of movement of said slide valves, means associated with said slide valves and nozzles to cause the slide valves to follow movements of the nozzles, differential elements, means connecting each differential element with one of said nozzles, and means connecting each differential element with said gyroscope pendulum and with one of said motors, whereby movement of said pendulum will cause said motors to impart movements of similar extent to the body to be stabilized.

4. In an apparatus for stabilizing bodies mounted on a ship, a gyroscope pendulum having a vertical axis, a gimbal ring carrying said pendulum, means to support said ring for oscillation about a normally horizontal axis of the ship, a bail, means to support said bail for oscillation about another normally horizontal axis of the ship extending at right angles to said first mentioned horizontal axis, means connecting said bail to said pendulum whereby oscillation of said pendulum moves said bail, two hydraulic motors having pistons therein mounted on said ship, means to supply fluid to said motors, valves in said fluid supply means for controlling the operation of the motors, linkage means connected to said gimbal ring to control the valve of one piston, linkage means independent of the first mentioned linkage means connected to said bail for controlling the valve of the other piston, means connecting said pistons to the body to be stabilized, said last connecting means including means to combine the component movements produced by said pistons and to impart the resulting movement to the body to be stabilized.

5. An apparatus for stabilizing bodies mounted on a movable support comprising a vertical gyroscope pendulum, hydraulically operated means mounted on said support, means connecting said hydraulically operated means to the body to be stabilized, means to supply fluid to said hydraulically operated means, valve mechanism in said fluid supply means for controlling the same, a mechanical connection between said gyroscope pendulum and said valve mechanism, resetting means associated with said valve mechanism, and means connected to said hydraulically operated means to control said resetting means whereby said valve mechanism is reset to normal position when said hydraulically operated means has performed a movement from the normal position which is proportional to the angular relative displacement of said pendulum and said support.

6. An apparatus for stabilizing bodies mounted on a movable support comprising a vertical gyroscope pendulum, two elements, means connecting said elements to said gyroscope pendulum whereby said elements respond separately and individually to component turns thereof about two normally horizontal axes of the support extending at right angles to each other, two shafts extending at right angles to each other and substantially parallel to said axes, means connecting said shafts to the body to control jointly the position of the body, two hydraulic motors each mounted on said support, permanent mechanical actuating connections between said motors and said shafts including a sectional shaft connected to one of said motors and one of said shafts and provided with universal joints therein, means to supply fluid to said motors, valves in said supply means for controlling the same, means connecting said elements and valves, whereby movement of said elements controls the operation of said valves, resetting means associated with said valves, and means connecting said resetting means to said motors, whereby said shafts will be turned through angles which are equal at all times to the component turns of the gyroscope pendulum.

JOHANNES SELIGMANN.